United States Patent
Cash et al.

(10) Patent No.: US 9,338,938 B2
(45) Date of Patent: May 17, 2016

(54) AGRICULTURAL RATE MANAGEMENT

(75) Inventors: Michael F Cash, Mountain View, CA (US); Douglas B Mayfield, Fremont, CA (US); Gregory D Chiocco, Sunnyvale, CA (US); Geoffrey W Mirfin, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 354 days.

(21) Appl. No.: 13/472,013

(22) Filed: May 15, 2012

(65) Prior Publication Data

US 2013/0311050 A1 Nov. 21, 2013

(51) Int. Cl.
| | |
|---|---|
| *G06F 7/70* | (2006.01) |
| *G06F 19/00* | (2011.01) |
| *G06G 7/00* | (2006.01) |
| *A01B 79/00* | (2006.01) |
| *A01C 21/00* | (2006.01) |
| *G01F 17/00* | (2006.01) |
| *G01F 25/00* | (2006.01) |

(52) U.S. Cl.
CPC ............ *A01B 79/005* (2013.01); *A01C 21/00* (2013.01); *G01F 17/00* (2013.01); *G01F 25/00* (2013.01)

(58) Field of Classification Search
CPC ...... E01C 19/20; G01C 21/00; G08G 1/0965; A01B 71/00; A01B 79/005; A01C 21/00; G01F 17/00; G01F 25/00
USPC ......... 701/2, 25, 41, 50; 703/2, 8; 460/1, 119, 460/6; 111/121, 178; 239/11, 156, 200, 1, 239/76; 427/139, 8; 700/90, 240
See application file for complete search history.

(56) References Cited

U.S. PATENT DOCUMENTS

| | | | | |
|---|---|---|---|---|
| 4,878,598 A | * | 11/1989 | Ruschhaupt, Jr. ...... | B05B 12/02 118/305 |
| 6,061,618 A | * | 5/2000 | Hale et al. ........................ | 701/50 |
| 6,070,539 A | | 6/2000 | Flamme | |
| 6,122,581 A | | 9/2000 | McQuinn | |
| 7,756,624 B2 | * | 7/2010 | Diekhans et al. ............... | 701/50 |
| 8,032,255 B2 | * | 10/2011 | Phelan ............... | A01D 41/1275 700/281 |
| 2008/0243386 A1 | * | 10/2008 | Kumar ................. | G08G 1/0962 701/300 |
| 2010/0298994 A1 | | 11/2010 | Mitchell | |
| 2011/0084851 A1 | * | 4/2011 | Peterson .............. | A01B 69/008 340/902 |
| 2011/0278381 A1 | | 11/2011 | Aral | |
| 2012/0036914 A1 | * | 2/2012 | Landphair .............. | A01C 7/081 73/1.16 |
| 2012/0234934 A1 | * | 9/2012 | Score et al. ........................ | 239/7 |
| 2012/0253760 A1 | * | 10/2012 | Zielke ................................ | 703/2 |

FOREIGN PATENT DOCUMENTS

| | | |
|---|---|---|
| EP | 2057877 A1 | 5/2009 |
| JP | 2005176741 A | 7/2005 |
| KR | 100976090 B1 | 8/2010 |

OTHER PUBLICATIONS

International Search Report and Written Opinion of the International Searching Authority in PCT/US2013/040800, Sep. 5, 2013.

(Continued)

*Primary Examiner* — Tuan C. To
*Assistant Examiner* — Isaac Smith
(74) *Attorney, Agent, or Firm* — NUPAT, LLC; Morrison Ulman

(57) ABSTRACT

Agricultural rate adjustments performed by autopilots or farm information displays help eliminate guesswork and improve farm efficiency.

12 Claims, 8 Drawing Sheets

(56) References Cited

OTHER PUBLICATIONS

JP 2005 176741 A, Abstract, best available translation, Jul. 7, 2005.
KR 2009 085914 A, Abstract, best available translation, Aug. 10, 2009.
Extended European Search Report in PCT/US2013040800, Dec. 18, 2015.
Office Action in Chinese patent application 201380024735.1, Feb. 22, 2016.

* cited by examiner

AGRICULTURAL RATE MANAGEMENT

TECHNICAL FIELD

The disclosure is generally related to automatic control systems for agricultural machines such as tractors, spray trucks and harvesters.

BACKGROUND

A common farming task is the application of material, such as seeds, fertilizer or pesticide, to a field. The material is stored in a tank or bin on a spray truck or tractor and dispensed over the field at a certain rate. A particular number of seeds or weight of fertilizer may be applied per acre, for example. Usually the amount of material carried by a farm vehicle is not exactly right to cover a farm field, however. There may be too much material resulting in some left over at the end of the job, or there may not be enough material and it runs out before the job is finished.

Running out of material early is clearly not desirable, but having material left over is also problematic. Materials often have limited lifetime and can't be stored for future use. Disposing of excess can be expensive and inconvenient. Furthermore farmers do not like to waste seeds, fertilizer, etc. They would rather use up the material in the field.

Analogous situations arise when harvesting except that material is collected from a field rather than dispensed over it. It is undesirable if a harvester reaches its maximum holding capacity at an inconvenient point. Farmers may prefer to unload a harvester near the edge of a field rather than in the middle, for example.

Presently farmers solve problems of running out or having too much by guesswork and feel. As a vehicle nears the last few rows a field an operator applies a little more or less material to use up or stretch out the amount available. This is done by adjusting flow rates, seed rates or other parameters. Another approach for "running out" problems is traversing part of a field a second time with a new load. This is frowned upon when crops are growing, however, as multiple passes tend to damage plants.

When a farmer sees that a storage bin on a harvester is getting full he must decide whether to keep going and risk reaching a capacity limit at an inconvenient point, or stop early and risk reduced efficiency if it turns out it would have been possible to harvest additional rows. Besides the inherent inaccuracy of guesswork, trying to predict application or harvesting endpoints is an unnecessary distraction for a vehicle operator that has many other tasks demanding his attention.

What are needed are systems and methods for managing agricultural application and harvesting rates. Farmers should not have to rely on, and be distracted by, guesswork to manage spray rates, position nurse tanks, plan for unloading stops, etc.

DETAILED DESCRIPTION

Agricultural rates, for planting, application, harvesting or similar tasks, can be managed automatically. Guesswork can be eliminated and farm efficiency improved. As many farm vehicles are equipped with autopilots or farm information displays, application or harvesting rate management may be included as a feature of these systems.

Figure 1:
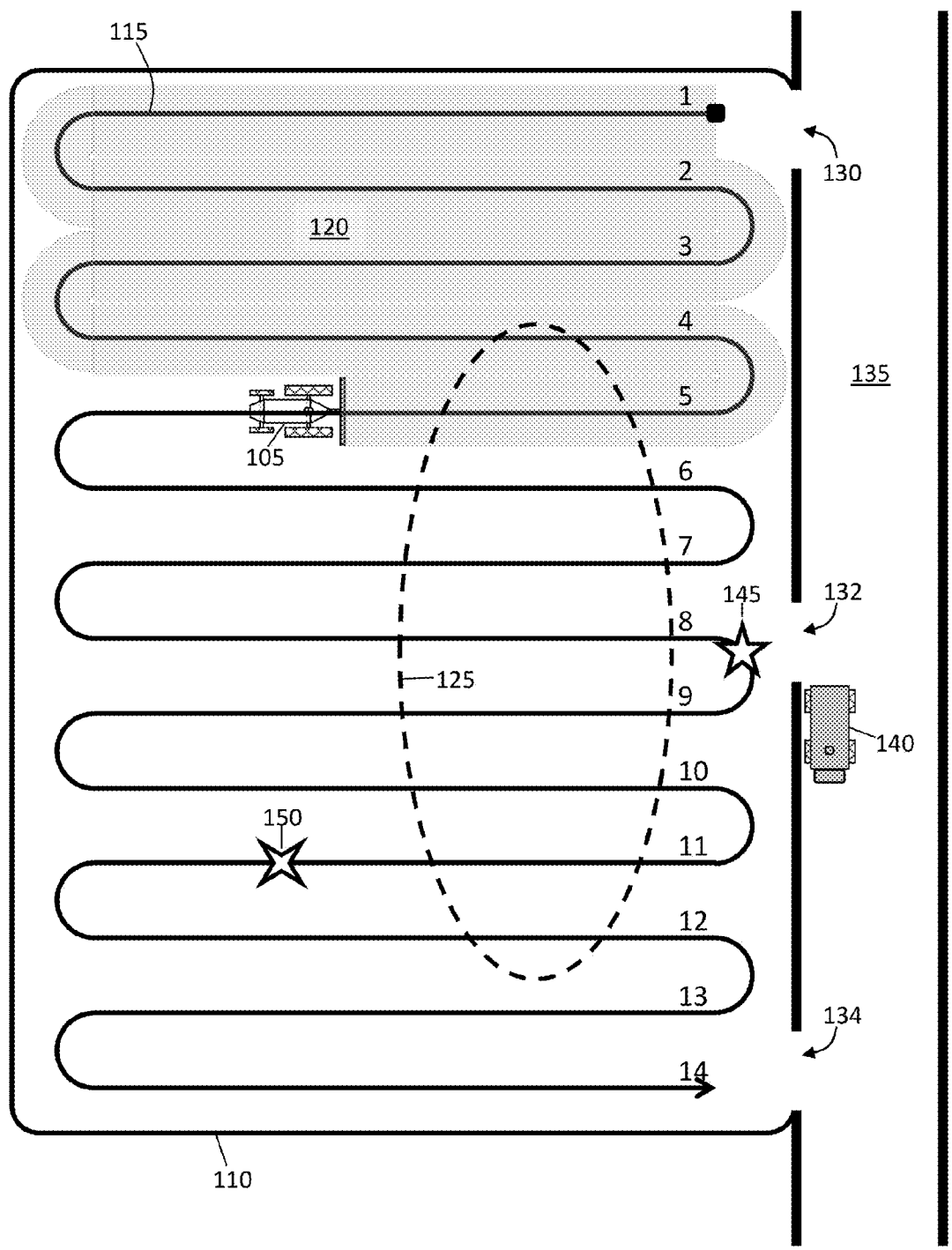
FIG. 1 illustrates agricultural field work scenarios.

FIG. 1 illustrates agricultural field work scenarios. In FIG. 1, farm vehicle 105 is applying material to field 110. The farm vehicle, e.g. a tractor, sprayer, seeder, etc., follows path 115 up and down rows numbered 1 through 14. Material has already been applied to rows 1-4 and about half of row 5 as indicated by shaded area 120. Dashed outline 125 indicates the boundary of a special rate area. Field 110 can be accessed from road 135 via breaks 130, 132 and 134. Support vehicle 140 may be a supply truck, grain cart, fuel tanker, etc. As described in greater detail below, five-point star 145 indicates a desired application end point while four-point start 150 indicates a predicted material fill-up or exhaustion point.

Consider, as a first scenario example, that work vehicle 105 is a sprayer applying fertilizer to crops in field 110. The spray operator would like to run out of fertilizer at the end of row 8, at the desired end point indicated by five-point star 145. An autopilot or farm information display makes this happen by: estimating the quantity of fertilizer on the sprayer; estimating the rate at which fertilizer is being dispensed; estimating the time remaining to the end point; and adjusting the dispensing rate such that the fertilizer runs out at the end point.

Suppose for example that a sprayer has 100 gallons of fertilizer remaining and is dispensing 10 gallons of fertilizer per minute. At this rate, the fertilizer supply will run out in ten minutes. If the time remaining to a desired end point is 12 minutes, then the dispensing rate must be adjusted by a scale factor of (10/12)=0.8333; i.e. the dispensing rate must be reduced to 8.333 gallons per minute to make the fertilizer run out at the end point.

As a second scenario example, consider that work vehicle 105 is a harvester that stores harvested crops in a bin. The harvester operator would like to know when and where his bin will become full so that he can plan a convenient unloading point. An autopilot or farm information display makes this happen by: estimating the quantity of crop already in the bin; estimating the rate of material accumulation; and estimating the time and location where the bin will be full.

Suppose for example that a harvester has 3,000 pounds of crop in a bin that can hold 4,000 pounds of crop. The harvester is travelling 4 miles per hour and collecting 100 pounds of crop per minute. The bin will be full in 10 minutes after which time the harvester will have travelled ⅔ of a mile. In FIG. 1, four-point star 150 is an example of such a fill-up or exhaustion point. Given information on when and where the bin will be full, the harvester operator may decide to unload early to a supply truck at the edge of a field (e.g. truck 140) or pre-position a cart at point 150.

As a third scenario example, consider that work vehicle 105 is a seeder planting seed in field 110. The seeder operator has entered an estimated seeding rate into his autopilot or farm information display, but would like to improve the accuracy of seed rate calculations. An autopilot of farm information display makes this happen by: estimating the quantity of seeds in a seeder bin at a starting point; estimating the seed dispensing rate; recording the time, location and seed quantity at an ending point; and using the time or distance travelled and the number of seeds actually dispensed to improve the estimate of the seed dispensing rate.

Suppose for example that a seeder has 200,000 seeds to spread over a 10 acre field. The seeder is controlled by an autopilot or farm information display that sets the seed rate to 20,000 seeds per acre. At the end of seeding the field, however, 20,000 seeds remain in the seeder; only 180,000 seeds have been planted. Given this information the autopilot or farm information display may update seed rate calibration factors to reflect the observed seed dispensing rate of 18,000 seeds per acre. This improves the accuracy of seed rate calibration for the next job.

Each of the scenarios just discussed and others like them rely on a farm vehicle autopilot or farm information display to perform material rate computations and to make material rate adjustments such as changing a fertilizer dispensing or seed planting rate. The capabilities of farm vehicle displays span a spectrum from basic readouts to sophisticated autopilots. Generally speaking, tractors, sprayers, harvesters and other work vehicles directly involved with application or harvesting use autopilots to follow specific paths in fields and to manage application or collection apparatus. Support vehicles, such as tank trucks and grain carts, usually do not require autopilots but can benefit from visual display of work vehicle location and service needs. Examples of a work vehicle display and a support vehicle display are now discussed.

Figure 2:
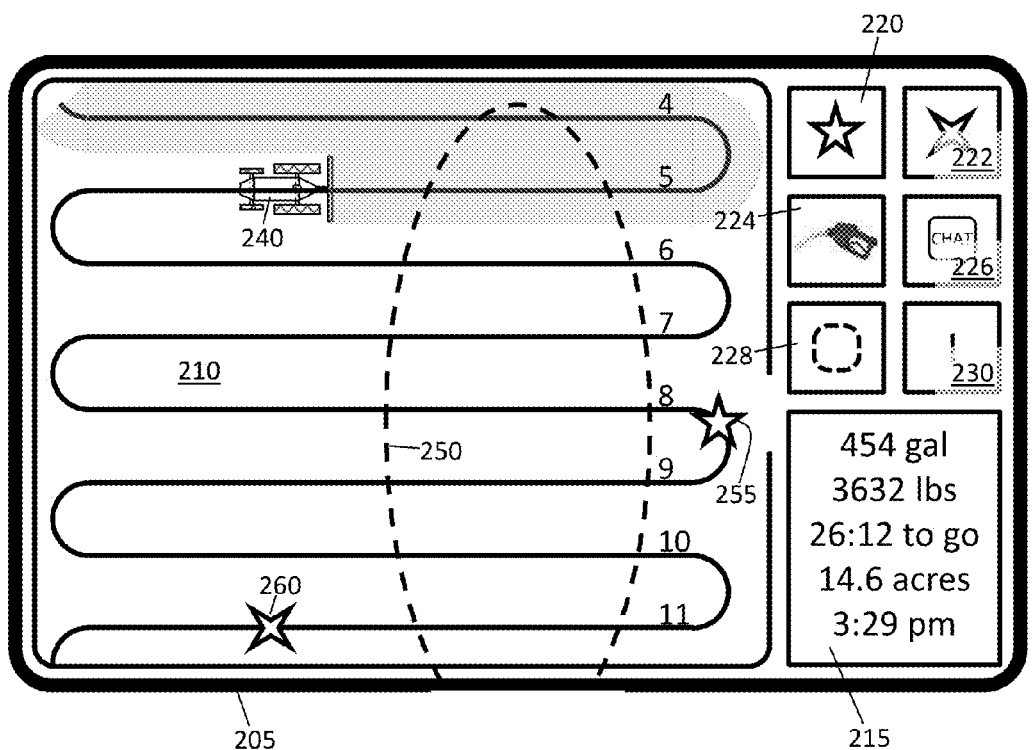
FIG. 2 shows a work vehicle display.

FIG. 2 shows a work vehicle display 205. The display includes one or more microprocessors, memory and input/output ports and connectors. Among many possible input/output ports may be provisions for: obtaining position, velocity and time information from GNSS receivers; obtaining sensor data for parameters such as material quantity in a tank or bin, vehicle steering angle, engine performance, etc.; sending commands to actuators to control application rate, steering angle, engine speed, etc.; and, wireless communications with other farm vehicles.

Display 205 may have a touch screen and/or user-input buttons (not shown) disposed around its edge. When implemented as a touch screen, the display area may be divided into a graphical area 210, a text display area 215, and/or a button area that includes buttons such as 220, 222, 224, 226, 228 and 230. Of course, information displayed on a touch screen may include all sorts of combinations of graphical and textual elements, the arrangement of which can change. The arrangement depicted in FIG. 2 is an example of just one possible display.

In graphical area 210, vehicle symbol shows the present location of the vehicle in a map view. A planned path for the vehicle includes a series of rows of which rows 4-11 are visible on the display. The display may be oriented north-up (as shown) or vehicle heading up. The display may also show the vehicle in the center or within a boundary. Many other views are possible. For example, a perspective view from behind and above the vehicle's present position may be offered in heading-up mode.

Text area 215 may include information such as quantities of seeds, fertilizer, pesticide, water, etc.; elapsed time, time remaining, speed, etc. Of course, textual information may also be presented in the graphical area and the text area may be hidden as needed.

Buttons 220-230 may be used for providing input to the display. Button 220 for example may be used to prepare the display for input of a desired application end point. Button 222 may be used to query the display for a predicted material exhaustion point. Button 224 may be used to plan fuel requirements. Button 226 may be used to initiate communications with displays on other vehicles via a wireless link. Button 228 may be used to prepare the display for input of a special rate area 250. Finally, button 230 may be used to prepare the display to record time and location specific notes. Of course, a modern farm display has myriad other functions that may be accessed via touch screen, real buttons, keyboards, joysticks, mice, trackballs, voice recognition or other means.

A display such as 205 may be used to perform any of the agricultural rate management tasks described herein. As an example if an operator wants to adjust an application rate to use up material by a certain end point he may push a button such as 220 to prepare the display for input. A second touch of the display at a desired end point may cause five-point star 255 to appear. The operator may then drag the star to adjust the desired end point. Based on the position of the end point, the display may automatically adjust the application rate and display old and new application rates for user approval. Similarly, pressing button 222 may cause four-point star 260 to appear to indicate where and when material will run out. Further button presses may communicate this information to a support vehicle so it can plan a service rendezvous. An operator may also use the display to point out locations on the map to an operator of a support vehicle by marking the locations with various symbols.

A special rate area (e.g. 125 in FIG. 1 or 250 in FIG. 2) is an area where a dispensing or harvesting rate is different from that in the rest of a field. A farmer may know from experience, for example, that a certain portion of a field needs more fertilizer than the rest. To indicate this he can draw a boundary like 250 in FIG. 2 to set a higher fertilizer application rate within the boundary. All the rate adjustment and scaling operations described herein may then take special rate areas into account. For example a certain rate might be 10 units per area in most of a field but 12 units per area in a special rate area. If the overall rate is increased by 5%, then the rate in most of the field will become 10.5 units per area, while the rate in the special rate area will become 12.6 units per area.

When special rate areas are in use, overall rate changes or scale factors may be calculated in a variety of ways. For example, an average application rate for all area remaining to be covered may be calculated and a scale factor may be derived from this average rate and the amount of material remaining. Scale factors may be calculated exactly, determined iteratively or recursively, or estimated. Furthermore overriding maximum and minimum application rates may be set that take precedence over calculated rates.

Figure 3:
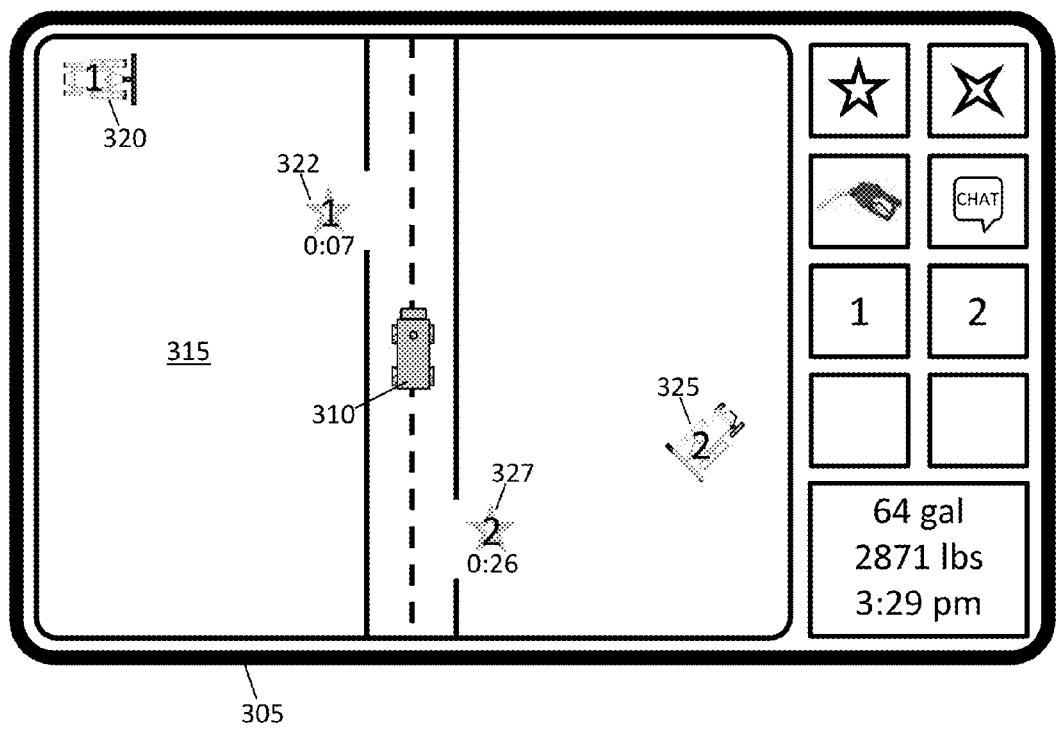
FIG. 3 shows a support vehicle display.

FIG. 3 shows a support vehicle display 305. Display 305 may be identical to display 205; however, when provisioned for support vehicle use it generally includes fewer features. For example, support vehicles usually do not need autopilot features such as steering angle sensors and actuators. Display 305 depicts a support vehicle 310 in heading-up mode in the center of a graphical area 315. Text and button areas are similar to that of display 205.

A support vehicle display may show the location of farm work vehicles and locations and times when those vehicles will need services such as loading or unloading. Display 305 shows a first work vehicle 320 that will need service at the point marked by star 322 in seven minutes. A second work vehicle 325 will need service at the point marked by star 327 in 26 minutes. Given this information, operators of support vehicles can plan when and where to be to maximize the efficiency of loading, unloading, refueling or other support operations.

Figure 4:
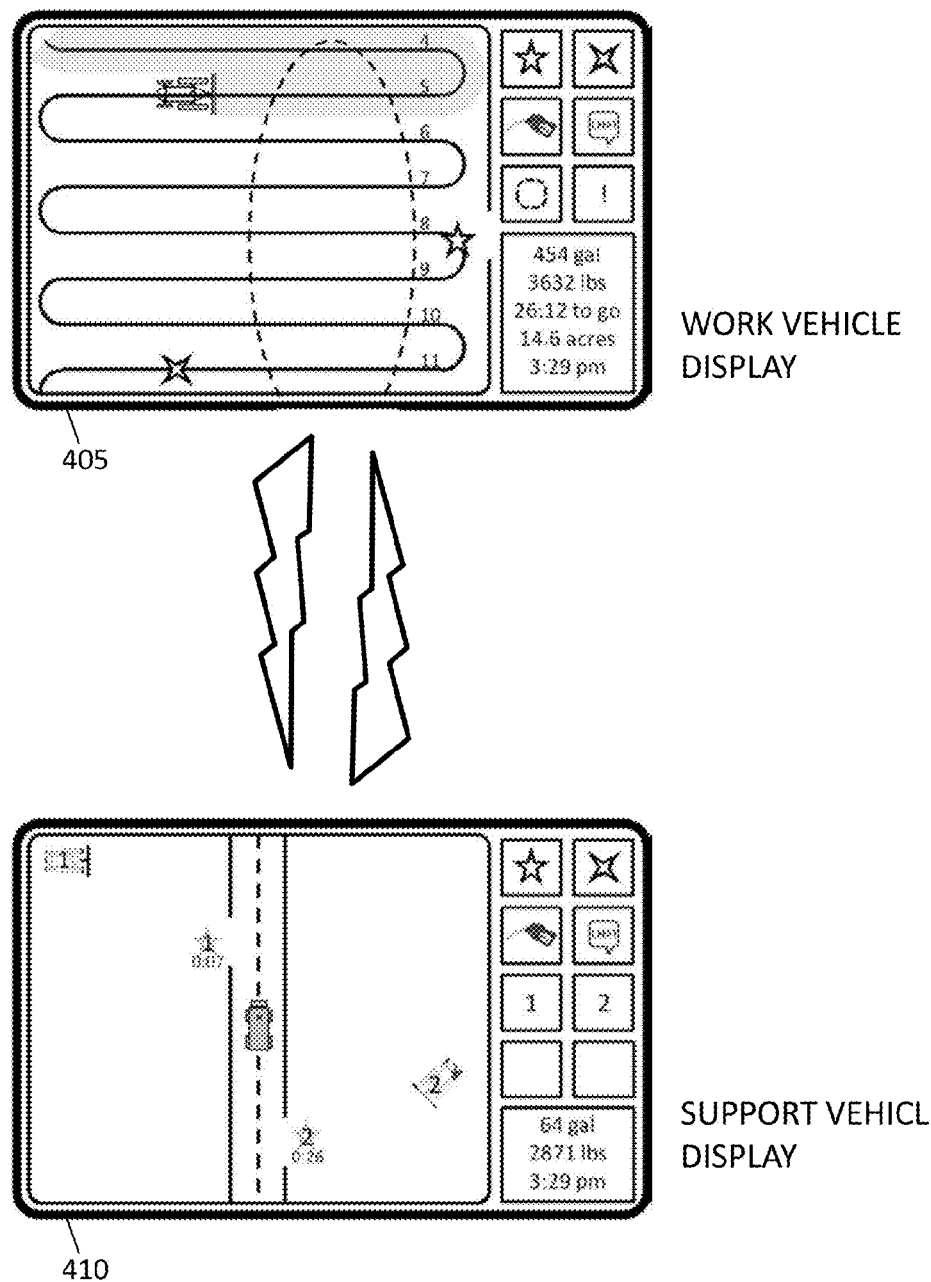
FIG. 4 illustrates communication between vehicles.

FIG. 4 illustrates communication between vehicles. In FIG. 4 work vehicle display 405 communicates with support vehicle display 410 via a wireless link. The wireless link may be a direct digital radio connection or a connection managed by a network. WiFi, cellular, satellite or similar networks may be used. Displays may operate as part of an ad hoc, peer to peer network or in a client-server model. The displays may communicate with displays on other vehicles and/or with computers, laptops, tablets, mobile devices, or cell phones. An operator may use a map display to point out a location to an operator in another vehicle by marking the location with a symbol that then appears on both operators' displays.

Figure 5:
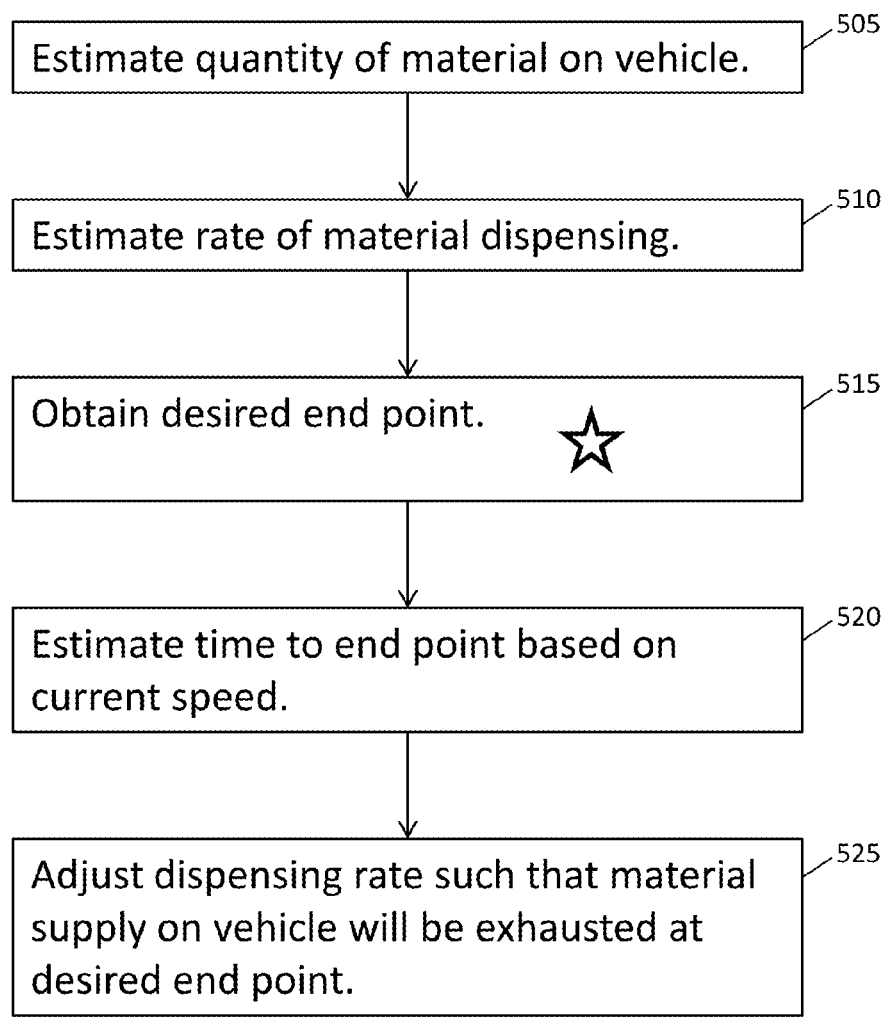
FIG. 5 is a flow chart for a method for adjusting application rate.
Figure 6:
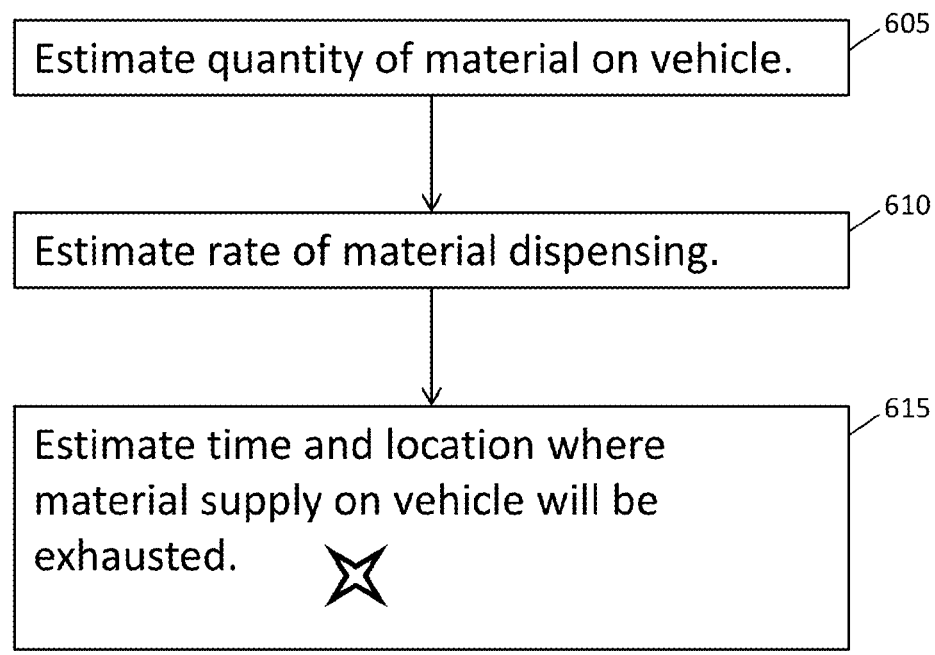
FIG. 6 is a flow chart for a method for predicting a material exhaustion point.
Figure 7:
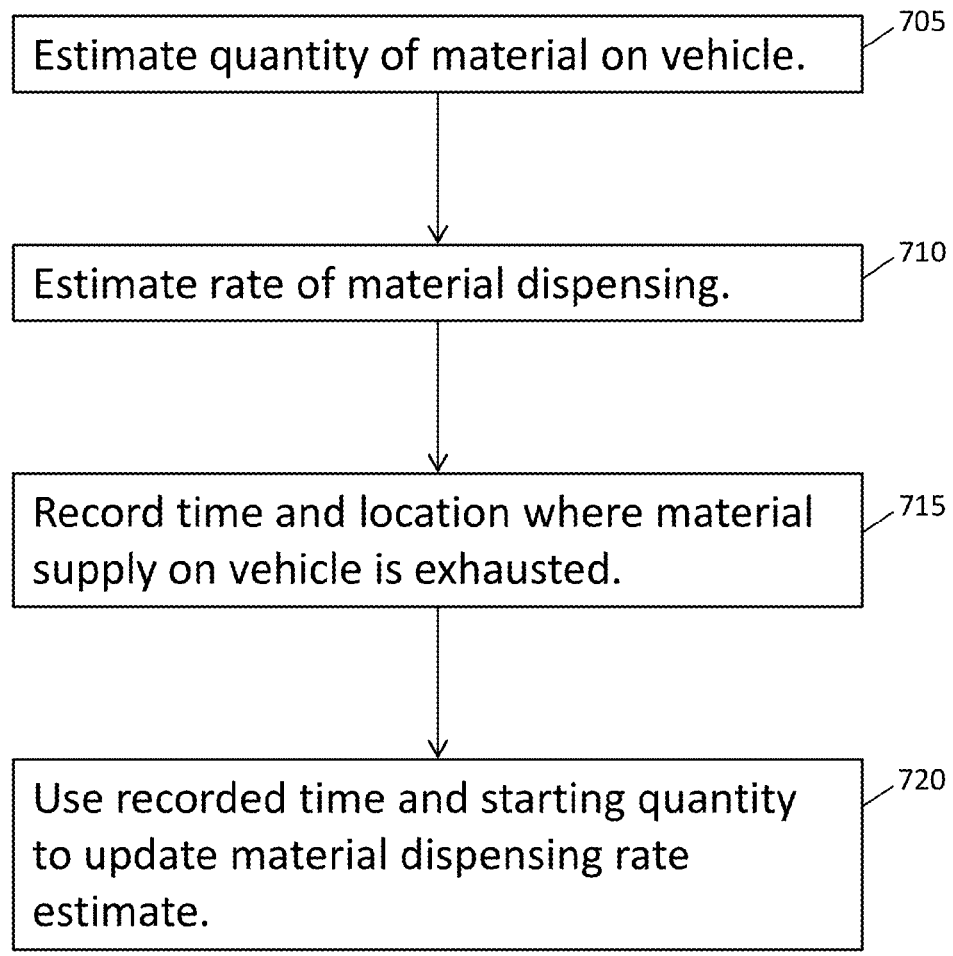
FIG. 7 is a flow chart for a method for adjusting rate calibration.

FIGS. 5-7 are flow charts that outline the methods described above. The operations in the flow charts are performed by agricultural autopilot or farm information display systems. Human operators need not be present when the methods are performed. Autopilots may be controlled remotely or programmed in advance, for example. The steps in the methods outlined in FIGS. 5-7 need not be performed in the order indicated and some steps may be omitted.

FIG. 5 is a flow chart for a method for adjusting application rate. In FIG. 5, step 505 is estimate quantity of material on a vehicle, step 510 is estimate rate of material dispensing, step 515 is obtain desired end point, step 520 is estimate time to end point based on current speed, and step 525 is adjust dispensing rate such that material supply on vehicle will be exhausted at desired end point. The method of FIG. 5 does not involve predicting where material will run out. An analogous method may be used for accumulating material during harvesting.

FIG. 6 is a flow chart for a method for predicting a material exhaustion point. In FIG. 6, step 605 is estimate quantity of material on vehicle, step 610 is estimate rate of material dispensing, and step 615 is estimate time and location where material supply on vehicle will be exhausted. The method of FIG. 6 is useful for positioning support vehicles such as nurse tanks of anhydrous ammonia used in side-dressing corn as an example. An analogous method may be used for accumulating material during harvesting.

FIG. 7 is a flow chart for a method for adjusting rate calibration. In FIG. 7, step 705 is estimate quantity of material on vehicle, step 710 is estimate rate of material dispensing, step 715 is record time and location where material supply on vehicle is exhausted, and step 720 is use recorded time and starting quantity to update material dispensing rate. This method may be used whenever an adequate means for estimating material quantity on a vehicle exists. Some examples of such means are: liquid tank gauges, vehicle suspension load cells, video estimation systems for dry materials, etc. An analogous method may be used for accumulating material during harvesting.

The agricultural rate adjustment methods described above are useful for improving material utilization on farms while reducing farm vehicle operator work load. Rates are not limited to changes in quantity of material per unit time. They may also refer to changes in quantity per unit length or area. For example a seeder may plant a certain number of seeds per minute, per distance traveled, or per area covered by a seed boom. Since autopilots and farm information displays have access to vehicle speed information, temporal rates may be converted into spatial rates and vice versa by using the relationship that distance equals speed multiplied by time. Similarly, area equals distance traveled multiplied by boom width.

Figure 8:
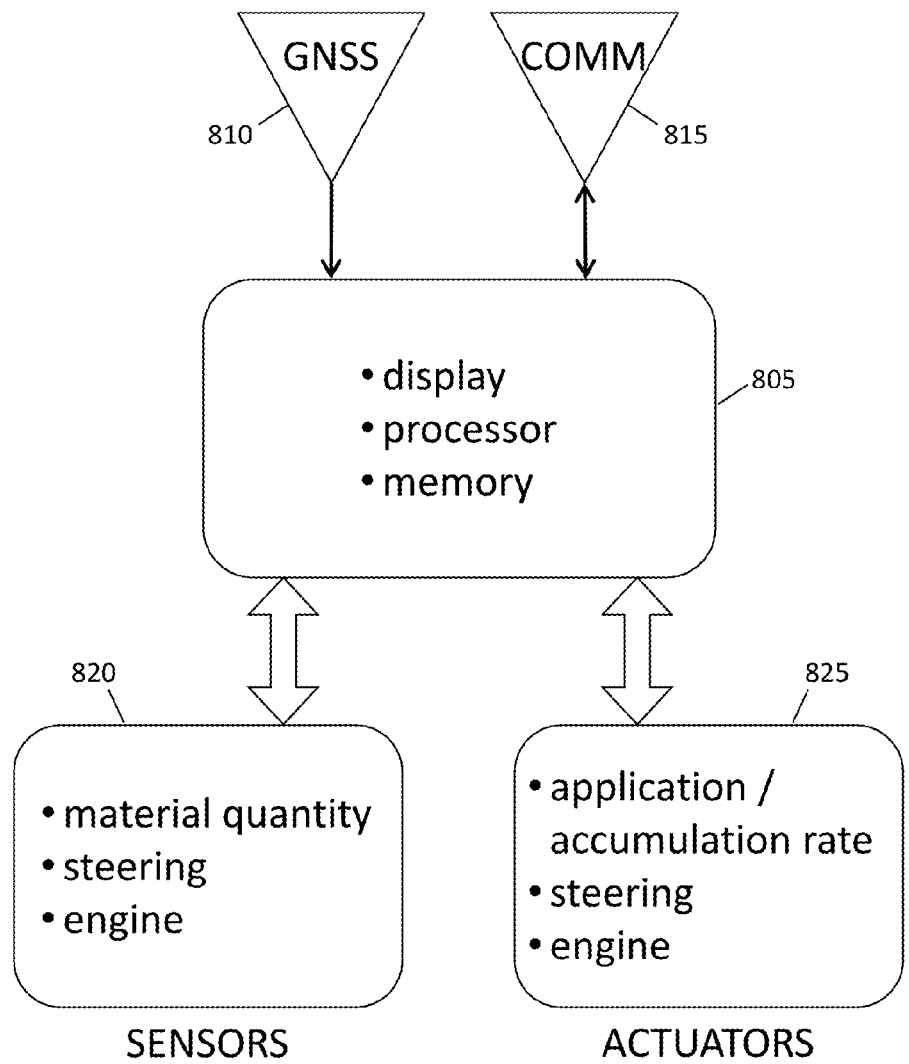
FIG. 8 is a block diagram of a farm information display system that manages application and/or harvesting rates.

FIG. 8 is a block diagram of a farm information display system that manages application and/or harvesting rates. In FIG. 8, display 805 includes one or more microprocessors and associated memory. Global navigational satellite system (GNSS) receiver 810 may operate with global positioning system, GLONASS, Galileo or other satellite constellations and may include capabilities to increase accuracy via the wide area augmentation system (WAAS) or real time kinematic (RTK) techniques, as examples. GNSS 810 reports position, speed and time to display/processor 805. Communications transceiver 815 may accommodate cellular, WiFi or other wireless network standards. Display/processor 805 uses transceiver 815 to communicate with other farm information displays on other vehicles or with base stations, optionally including those providing access to proprietary networks or to the internet. Optional sensors 820 detect and report farm vehicle conditions such as material quantities, steering angles and engine performance parameters to the display/processor 805. Sensors may report that a bin or tank has a certain volume or weight of material such as grain, fertilizer or diesel fuel, that the vehicle is steering a turn, or that an engine is running at a certain speed, as examples. Optional actuators 825 make changes in farm vehicle conditions such as application or accumulations rates, steering angles, or engine conditions.

A system such as that shown in FIG. 8 may perform the agricultural rate management functions described above. When such a system is provisioned as a farm information display many of the sensors and actuators depicted may be omitted. For example, a support vehicle that is not capable of dispensing seed need not have seed rate actuators. When a system is provisioned as an autopilot it includes steering actuators and may include engine actuators such as throttle controls.

The systems and methods described above allow agricultural rates to be manage automatically instead of by guesswork. This improves the efficiency of planting, application, harvesting and similar farming tasks. As many farm vehicles are equipped with autopilots or farm information displays, application or harvesting rate management may be included as a feature of these systems.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for managing agricultural rates comprising:
   providing a farm information display system for a vehicle, including: a display, processor and memory; a GNSS receiver that estimates vehicle position and speed; a material quantity sensor; and, an application rate actuator;
   estimating, using the processor, a material quantity on the vehicle using the material quantity sensor;
   estimating, using the processor, a rate of change of material on the vehicle;
   obtaining a desired vehicle end point from a user;
   estimating, using the processor, a time to the vehicle end point based on the estimated vehicle speed; and,
   adjusting, using the processor, the rate of change of material via the application rate actuator such that: (1) material quantity on the vehicle is exhausted when the vehicle reaches the vehicle end point, and (2) within a user-defined special rate area, the rate of change of material is different from that outside the special rate area.

2. The method of claim 1 where the rate of change is estimated with respect to time.

3. A method for managing agricultural rates comprising:
providing a farm information display system for a vehicle, including: a display, processor and memory; a GNSS receiver that estimates vehicle position and speed; a material quantity sensor; and, an application rate actuator;
estimating, using the processor, a material quantity on the vehicle using the material quantity sensor;
estimating, using the processor, a rate of change of material on the vehicle;
obtaining a desired vehicle end point from a user;
estimating, using the processor, a distance to the vehicle end point based on the estimated vehicle position; and,
adjusting, using the processor, the rate of change of material via the application rate actuator such that: (1) material quantity on the vehicle is exhausted when the vehicle reaches the vehicle end point, and (2) within a user-defined special rate area, the rate of change of material is different from that outside the special rate area.

4. The method of claim 3 where the rate of change is estimated with respect to vehicle position.

5. A method for managing agricultural rates comprising:
providing a farm information display system for a vehicle, including: a display, processor and memory; a GNSS receiver that estimates vehicle position and speed; and, a material quantity sensor;
estimating, using the processor, a material quantity on the vehicle using the material quantity sensor;
estimating, using the processor, a rate of change of material on the vehicle; and,
estimating, using the processor, a time and location where the material quantity on the vehicle will be exhausted, taking into account a different rate of change of material within a user-defined special rate area.

6. The method of claim 5 further comprising communicating the estimated material quantity to another vehicle via a wireless network.

7. The method of claim 5 further comprising communicating the estimated time and location to another vehicle via a wireless network.

8. A farm information system comprising:
a display including a processor and memory;
a GNSS receiver in communication with the display, the receiver estimating position and speed of a vehicle;
a material quantity sensor in communication with the display, the sensor estimating a material quantity on the vehicle; and,
an application rate actuator in communication with the display, the actuator adjusting material application rate;
wherein the display:
estimates a rate of change of material quantity on the vehicle;
obtains a desired vehicle end point from a user;
estimates a time to the vehicle end point based on estimated vehicle speed; and,
adjusts the rate of change of the material quantity via the application rate actuator such that: (1) the material quantity on the vehicle is exhausted when the vehicle reaches the vehicle end point, and (2) within a user-defined special rate area, the rate of change of material is different from that outside the special rate area.

9. The system of claim 8 where the rate of change is estimated with respect to time.

10. The system of claim 8 further comprising a wireless transceiver in communication with the display, the wireless transceiver communicating with a farm information system on a second vehicle.

11. The system of claim 10, the wireless transceiver communicating the vehicle end point to the farm information system on the second vehicle.

12. The system of claim 10, the wireless transceiver communicating a map location to the farm information system on the second vehicle.

* * * * *